Patented Nov. 9, 1943

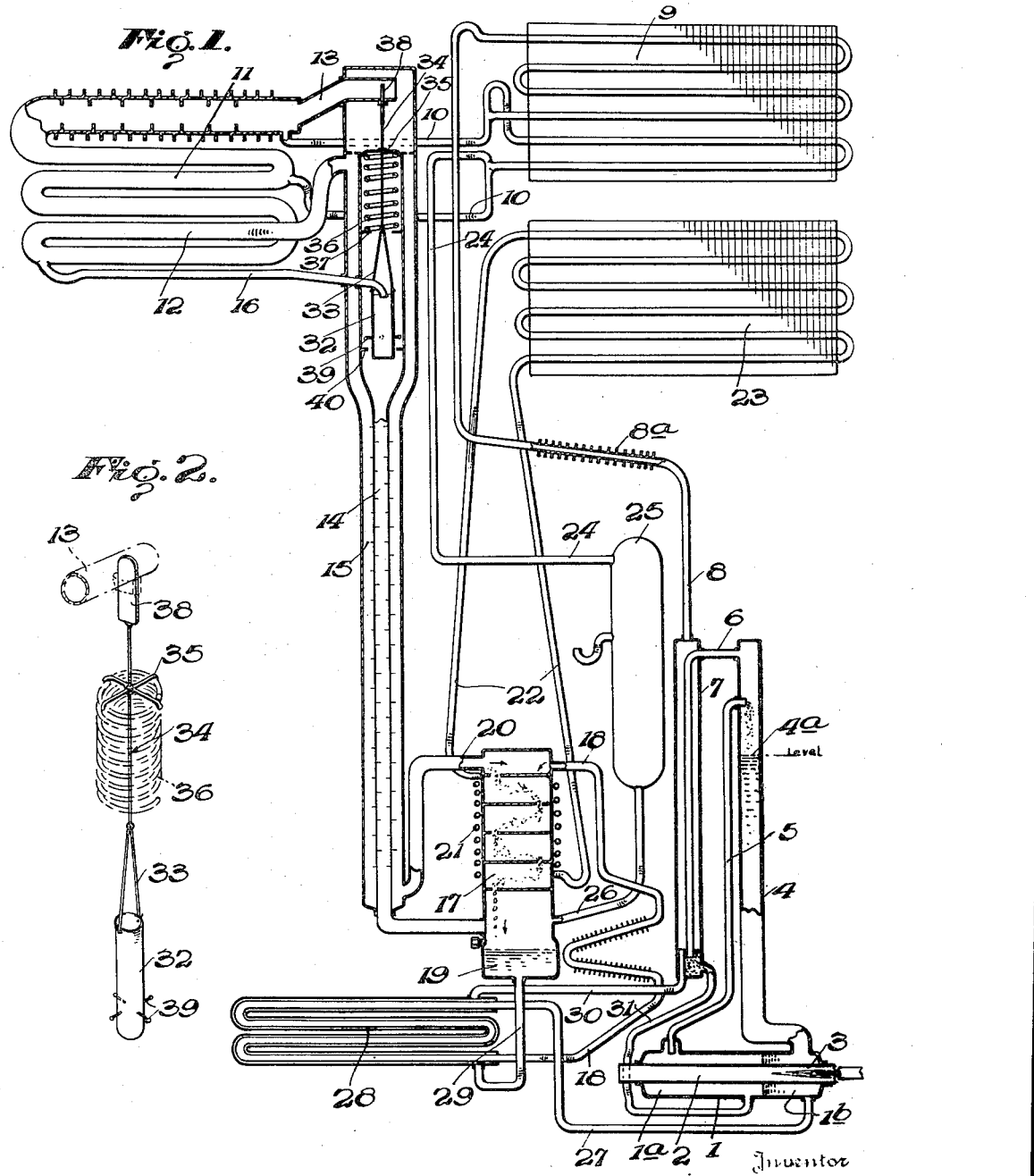

2,333,780

UNITED STATES PATENT OFFICE 2,333,780

CONTINUOUS ABSORPTION REFRIGERATING SYSTEM

Ernest W. Guernsey, Baltimore, Md., assignor to Consolidated Gas Electric Light and Power Company of Baltimore, Baltimore, Md., a corporation of Maryland Application May 25, 1938, Serial No. 210,063

12 Claims. (Cl. 62—5)

This invention relates to refrigerating systems of the continuous absorption type and more particularly to the control of the circulation of gas in such a system.

A refrigerating system of the continuous absorption type, generally speaking, comprises a sealed system containing a charge which includes a solution such as ammonia in water and a gas such as hydrogen. In the following specification a charge of these materials is assumed for purposes of description but it will be understood that the invention is not limited to the use of these particular materials. The operation of such systems may be considered typically as a combination of three cycles, the cycle of the ammonia solution, the cycle of the ammonia vapor, and the gas or hydrogen cycle. The solution circulates from a generator, wherein it is heated to drive off ammonia vapor, to an absorber where ammonia vapor previously driven off is reabsorbed, and then returns to the generator. The ammonia vapor driven off in the generator is the refrigerating medium. It circulates from the generator to a condenser and thence to an evaporator where it evaporates while absorbing heat and thus produces refrigeration, and it is then returned to the absorber to be reabsorbed in the solution. The gas circulates from the absorber to the evaporator where it removes the ammonia vapor and returns it to the absorber.

In systems of this type as heretofore used, a drain connection has been provided from the bottom of the evaporator so that, in case the circulation of hydrogen is not sufficient to evaporate all of the liquid ammonia supplied to the evaporator, the excess liquid ammonia will drain from the bottom of the evaporator and can be returned to the absorber. This condition, however, is undesirable as the unevaporated liquid ammonia performs substantially no function in cooling the evaporator. On the other hand, if the circulation of gas is greater than required to evaporate all the liquid ammonia, then there is undesirable excess of gas circulating in the evaporator and also some of the hydrogen may escape through the drain pipe without passing through the evaporator as intended.

It is an object of the present invention to control the circulation of gas automatically in proportion to the quantity of liquid ammonia to be evaporated.

Another object is to control the circulation of gas so as to limit it to an amount sufficient but only just sufficient to effect substantially complete evaporation of the liquid ammonia supplied to the evaporator.

A further object is to increase the circulation of gas automatically in the event that substantial quantities of unevaporated liquid ammonia pass through the evaporator, so as to insure substantially complete evaporation of all of the liquid ammonia delivered to the evaporator.

A still further object is to decrease the circulation of gas in the event that the quantity of gas passing through the evaporator is substantially in excess of the amount required to evaporate all of the liquid ammonia delivered to the evaporator.

The drawing illustrates diagrammatically a typical refrigerating system of the continuous absorption type, which is provided with one form of circulation controlling means embodying the invention, but it is to be expressly understood that the invention can be embodied in other forms as well as in other systems and that the drawing is for purposes of illustration only and is not to be taken as a definition of the limits of the invention, reference being had to the appended claims for this purpose.

In said drawing,

Fig. 1 is a diagrammatic layout of a refrigerating system, and

Fig. 2 is a perspective view of part of a suitable circulation controlling means.

Referring now to the drawing, the generator, which may be of any suitable type, is here shown as a tubular container 1 through which passes a heating tube 2. Any suitable heating means can be employed to heat the generator, such as the gas flame 3 burning in the tube 2, it being understood that the operation of the heating means is preferably controlled automatically in accordance with the requirements of the refrigerating system. The container 1 is divided longitudinally into two sections 1a and 1b, section 1a containing strong solution and section 1b containing weak solution. A substantially vertical column 4 is in open communication with the upper part of section 1b and forms a part of the generator, being partially filled with solution as indicated by the level 4a in the column. The quantity of solution in the column is replenished by strong solution from the section 1a by means of the pump tube 5 in which rises ammonia vapor driven off from the strong solution, the rising vapor carrying with it small quantities of the strong solution which are discharged into the column 4.

In the form shown, ammonia vapor driven off in the generator is conducted by pipe 6 to the bottom of the tubular container 7, wherein it comes in contact with cooler strong solution being returned from the absorber as hereinafter described. This contact causes some liquefaction of water vapor and transfer of heat to the solution, resulting in increased efficiency of the system. The vapor then rises through the tube 8, the section 8a of which may comprise a rectifier wherein any entrained moisture is condensed, to the ammonia vapor condenser 9. The liquid ammonia here produced flows through the pipes 10 into the evaporator 11, and as it flows downwardly through the coils of the evaporator, it absorbs heat, evaporates and produces refrigeration.

The ammonia vapor produced in the evaporator 11 is carried off by a current of hydrogen which enters the bottom of the evaporator by means of the pipe 12. The current of hydrogen passes upwardly through the evaporator coils and continuously removes ammonia vapor, forming at the top of the evaporator a cool, heavy mixture of hydrogen gas and ammonia vapor. This ammonia-rich mixture leaves the evaporator by the pipe 13 and passes downwardly through the central pipe or chamber 14 of a gas heat exchanger wherein it is surrounded by a rising current of warm light hydrogen gas in the external pipe or chamber 15 of the gas heat exchanger. Any unevaporated liquid ammonia drains from the bottom of the evaporator through the pipe 16.

The descending mixture of ammonia vapor and hydrogen gas, which has been warmed somewhat in the gas heat exchanger, passes from the exchanger into the bottom of the absorber 17 wherein it comes in contact with weak solution entering the top of the absorber through the pipe 18. The ammonia vapor is thereby absorbed in the solution, forming a quantity of strong solution in the bottom of the absorber at 19, while the hydrogen, now substantially free of ammonia vapor, passes out at the top of the absorber through the pipe 20 and into the external chamber 15 of the gas heat exchanger as above described.

The heat which is liberated in the absorber 17 by the absorption of the ammonia vapor therein may be carried away by any suitable means such as the cooling coil 21 which is connected by pipes 22 with a condenser 23, this system containing a charge of a suitable vaporizable and condensable substance such as methyl chloride. The system may also include provision for increasing the pressure in the system in the event that said pressure is insufficient to condense all of the ammonia vapor produced by the generator, as by reason of excessive temperature. In this event excess ammonia vapor passes from the condenser 9 by way of the pipe 24 to the pressure chamber 25 wherein it displaces a quantity of hydrogen gas through the pipe 26 into the absorber 17, thus increasing the pressure within the system in known manner.

The weak solution leaves the generator 1 by means of a pipe 27 and passes through the inner tubes of a liquid heat exchanger 28 to the inlet pipe 18 at the top of the absorber. The strong solution shown at 19 in the bottom of the absorber passes out through the pipe 29 to the outer tubes of the liquid heat exchanger 28 and thence through a pipe 30 to the bottom of the tubular container 7 described above where it comes in contact with the vapor produced by the generator. From the bottom of the container 7 the strong solution then passes by a pipe 31 to the section 1a of the generator.

The circulation of gas through the evaporator 11 is controlled by any suitable means such as a valve, the position of which is adjusted automatically in proportion to the amount of liquid ammonia delivered to the evaporator. The discharge of unevaporated liquid ammonia from the evaporator is an indication that the rate of circulation of the gas is insufficient, the degree of insufficiency being indicated by the amount of the discharge. Hence the discharge may be used as a guide to determine the proper amount of circulation. As long as there is some discharge of liquid ammonia, the circulation of gas cannot be excessive, and hence the circulation may suitably be controlled or adjusted to maintain only a very slight discharge of liquid ammonia from the evaporator, the amount being kept as small as possible in order to approach the ideal condition as closely as possible. One method of regulating the gas circulation to maintain this condition consists in providing for the disposal of the discharged liquid ammonia at a rate just sufficient to equal the desired amount of discharge from the evaporator, and then providing suitable mechanical means which operate to increase or decrease the gas circulation according to whether the discharge from the evaporator is greater or less than the rate of disposal.

The drawing illustrates one form of apparatus wherein this method is carried out, the disposal of the discharge taking place by slow evaporation the rate of which is determined by the design of the apparatus. As shown, the upper end of the gas heat exchanger is enlarged somewhat to provide space in the central chamber 14 for a movable container or bucket 32 into which excess liquid ammonia is discharged by the evaporator drain pipe 16 and from which the liquid ammonia slowly evaporates. The bucket 32 is resiliently supported in any suitable manner and in the form shown it is carried by hangers 33 on a rod 34 which carries a spider 35. The ends of the arms of the spider are supported by a coil spring 36 seated on a ledge or shouler 37 formed interiorly in the inner chamber 14 of the gas heat exchanger. The upper end of the rod 34 carries a damper or valve 38 arranged to open or close the end of the pipe 13 through which the mixture of hydrogen and ammonia leaves the evaporator and enters the heat exchanger. The lowermost position of the bucket 32 can be limited in any suitable manner as by providing the bucket with laterally extending pins 39 adapted to engage a stop or stops 40 on the inner wall of the chamber 14.

The general operation of a system of this type is well understood in the art and will be clear from the foregoing description. With respect to the control of the circulation of gas it will be seen that in normal operation the position of the bucket 32 and accordingly of the damper 38 will depend on the amount of liquid ammonia in the bucket, which in turn will be determined by the point at which a balance is established between the rate of evaporation of liquid ammonia from the bucket and the rate of delivery of liquid ammonia to the bucket by the drain pipe 16. When the system is not operating, the valve 38 will be substantially closed, the bucket being empty and accordingly in its uppermost position. When the system starts to operate, the gas circulation will be limited by the valve 38 and liquid ammonia will be discharged into the bucket. Inasmuch as the evaporation from the bucket takes place into an atmosphere of ammonia-rich hydrogen which is only slightly warmed, the rate of evaporation will be slow and liquid ammonia will accumulate in the bucket which will then descend. The gas circulation will thereby be increased gradually until the rate of delivery of liquid ammonia to the bucket is reduced to an amount equal to this slow rate of evaporation from the bucket.

A balance is established at this point and no further change takes place in the position of the bucket until there is a change in operating conditions. The point at which this balance occurs depends on the rate of evaporation from the bucket, and this can be controlled within limits by designing the bucket to provide greater or less evaporating surface of the liquid ammonia, or by making the bucket of porous material, etc. Further the vertical position of the bucket in the heat exchanger can be adjusted to control the rate of evaporation inasmuch as the descending current of gas and ammonia vapor is progressively warmer and hence less saturated.

When this balance is established, an increase in the amount of liquid ammonia delivered to the evaporator will result in a larger quantity of unevaporated liquid ammonia being delivered to the bucket. Hence the bucket will descend further against the tension of the spring, thereby increasing the gas circulation and evaporating more of the liquid ammonia until the balance is again established. On the other hand, if the amount of liquid ammonia delivered to the evaporator should decrease, then the amount of unevaporated liquid ammonia delivered to the bucket will likewise decrease. The bucket will then be raised by the spring, decreasing the circulation of gas and increasing the amount of liquid ammonia delivered to the bucket until the balance is again established.

It will be seen that the circulation of gas is automatically controlled and limited to an amount sufficient but only just sufficient to evaporate substantially all of the liquid ammonia delivered to the evaporator, inasmuch as the rate of evaporation from the bucket is slow and the amount of liquid ammonia delivered to the bucket under balanced conditions is correspondingly small and is negligible. Excessive gas circulation is avoided, thus increasing the thermal efficiency of the evaporator. The amount of circulation of gas, however, is at all times sufficient to effect substantially complete evaporation of the liquid ammonia. Moreover the operation insures that the drain pipe from the evaporator shall be sealed with liquid ammonia at all times thereby preventing the escape of hydrogen through the drain pipe without passing through the evaporator. These advantages are obtained with a delicate, positive control which is automatic in its operation and at the same time relatively inexpensive and simple.

While only one embodiment of the invention has been described and illustrated in the drawing, it is to be understood that the invention is not limited to this embodiment but is capable of a variety of mechanical expressions, many of which will now occur to those skilled in the art, and that changes may be made in the form, details of construction and arrangement of the parts, all without departing from the spirit of the invention. Reference should therefore be had to the appended claims to determine the limits of the invention.

What is claimed is:

1. A refrigerating system of the continuous absorption type comprising a generator for generating refrigerating vapor, an evaporator, means for condensing said vapor and circulating the condensate through said evaporator, means for circulating gas through said evaporator to remove evaporated condensate therefrom, flow regulating means through which said circulating gas passes, an actuating device for said regulating means, said device receiving unevaporated condensate from said evaporator whereby it tends to move in one direction, and means urging said device in the opposite direction, said device being constructed and arranged to allow the escape of condensate from said device at a predetermined rate.

2. A refrigerating system of the continuous absorption type comprising a generator for generating refrigerating vapor, an evaporator, means for condensing said vapor and circulating the condensate through said evaporator, means for circulating gas through said evaporator to remove evaporated condensate therefrom, flow regulating means through which said circulating gas passes, an actuating element for said regulating means for containing unevaporated condensate, and means for conducting unevaporated condensate from said evaporator to said element, said element being constructed and arranged to allow the escape of condensate from said element at a predetermined rate.

3. A refrigerating system of the continuous absorption type comprising means for generating refrigerating vapor, an evaporator, means for condensing said vapor and circulating the condensate through said evaporator, means for circulating gas through said evaporator, and flow regulating means through which said circulating gas passes comprising balanced actuating means disposed in said system and constructed and arranged to receive unevaporated condensate discharged from said evaporator and to discharge said condensate from said actuating means into said system at a predetermined rate.

4. A refrigerating system of the continuous absorption type comprising means for generating refrigerating vapor, an evaporator, means for condensing said vapor and circulating the condensate through said evaporator, means for circulating gas through said evaporator to remove evaporated condensate therefrom, means for discharging the mixture of gas and vapor from said evaporator in heat exchanging relationship with the incoming gas, whereby said mixture is warmed, and means for regulating the flow of gas comprising valve means for controlling the discharge from the evaporator and valve actuating means constructed and arranged to receive unevaporated condensate discharged from said evaporator and to allow evaporation of said condensate into said warmed mixture of gas and vapor.

5. A refrigerating system of the continuous absorption type comprising means for generating refrigerating vapor, an evaporator, means for condensing said vapor and circulating the condensate through said evaporator, means for circulating gas through said evaporator to remove evaporated condensate therefrom, means for discharging the mixture of gas and vapor from said evaporator in heat exchanging relationship with the incoming gas, whereby said mixture is warmed, and means for regulating the flow of gas comprising valve means for controlling the discharge from the evaporator and a valve actuating container disposed in said warmed mixture of gas and vapor and constructed and arranged to receive unevaporated condensate discharged from said evaporator and to allow evaporation of said condensate into said warmed mixture.

6. A refrigerating system of the continuous absorption type comprising a generator for refrigerating vapor, an evaporator, means for condensing said vapor and circulating the condensate through said evaporator, means for circulating gas through said evaporator to remove evaporated condensate therefrom, means for discharging the mixture of gas and vapor from said evaporator in heat exchanging relationship with the incoming gas, whereby said mixture is warmed, a valve for controlling the circulation of gas, and valve actuating means comprising a container resiliently mounted in said warmed mixture and operatively connected with said valve, said container being constructed and arranged to receive unevaporated condensate discharged from said evaporator and to allow evaporation of said condensate into said warmed mixture, whereby said container moves in one direction or the other as the rate of delivery of condensate to said container is greater or less than the rate of evaporation from said container.

7. A refrigerating system of the continuous absorption type comprising a generator for generating refrigerant vapor, an evaporator, means for condensing said vapor and circulating the condensate through said evaporator, an absorber, means for circulating gas through said evaporator and absorber and requiring that all gas in circulation pass through said evaporator at all times to remove the evaporated condensate from said evaporator, and flow regulating means in said path and acting to vary the rate of flow of all gas in circulation through said evaporator and absorber, said last named means being responsive to the discharge of unevaporated condensate from said evaporator for increasing the flow of gas therethrough.

8. A refrigerating system of the continuous absorption type comprising a generator for generating refrigerant vapor, an evaporator, means for condensing said vapor and circulating the condensate through said evaporator, an absorber, means for circulating gas through said evaporator and absorber and requiring that all gas in circulation pass through said evaporator at all times to remove the evaporated condensate from said evaporator, and flow regulating means in said path and acting to vary the rate of flow of all gas in circulation through said evaporator and absorber, said means being actuated in response to the quantity of unevaporated condensate discharged from said evaporator to increase the flow of gas in proportion to the amount of said unevaporated condensate.

9. A refrigerating system of the continuous absorption type comprising a generator for generating refrigerant vapor, an evaporator, means for condensing said vapor and circulating the condensate through said evaporator, an absorber, means for circulating gas through said evaporator and absorber and requiring that all gas in circulation pass through said evaporator at all times to remove the evaporated condensate from said evaporator, flow regulating valve means interposed in said path and acting to vary the rate of flow of all gas in circulation through said evaporator and absorber, and operating means for said valve means including an element actuated by the discharge of unevaporated condensate from said evaporator.

10. A refrigerating system of the continuous absorption type comprising a generator for generating refrigerant vapor, an evaporator, means for condensing said vapor and circulating the condensate through said evaporator, an absorber, means for circulating gas through said evaporator and absorber and requiring that all gas in circulation pass through said evaporator at all times to remove evaporated condensate from said evaporator, flow regulating means in said path and acting to vary the rate of flow of all gas in circulation through said evaporator and absorber, and actuating means for said regulating means comprising means arranged to receive unevaporated condensate from said evaporator and to discharge said condensate from said receiving means at a predetermined rate.

11. A refrigerating system of the continuous absorption type comprising a generator for generating refrigerant vapor, an evaporator, means for condensing said vapor and circulating the condensate through said evaporator, an absorber, means for circulating gas through said evaporator and absorber and requiring that all gas in circulation pass through said evaporator at all times to remove evaporated condensate from said evaporator, flow regulating means in said path and acting to vary the rate of flow of all gas in circulation through said evaporator and absorber, and actuating means for said regulating means arranged to receive unevaporated condensate from said evaporator and to allow the escape of said condensate from said actuating means at a predetermined rate, said actuating means being constructed and arranged to move said regulating means in one or the other direction as the rate of delivery of condensate to said actuating means is greater or less than the rate of escape of condensate therefrom.

12. A refrigerating system of the continuous absorption type comprising means for generating refrigerant vapor, an evaporator, means for condensing said vapor and circulating the condensate through said evaporator, an absorber, means for circulating gas in a path through said evaporator and absorber to remove evaporated condensate from said evaporator, and flow regulating means in said path for regulating the circulation of gas through said evaporator and absorber and comprising resiliently suported actuating means disposed in said system and constructed and arranged to receive unevaporated condensate discharged from said evaporator and to discharge said condensate from said actuating means into said system at a predetermined rate.

ERNEST W. GUERNSEY.